United States Patent [19]

Jones, Jr. et al.

[11] Patent Number: 4,728,724
[45] Date of Patent: Mar. 1, 1988

[54] OPTICAL DATA STORAGE MEDIUM COMPRISING A CHROMOPHORE/POLYMER INFORMATION LAYER

[75] Inventors: R. Sidney Jones, Jr., Randolph; Michael M. Besso, West Orange; James E. Kuder, Fanwood, all of N.J.

[73] Assignee: Hoechst Celanese Corporation, Somerville, N.J.

[21] Appl. No.: 720,605

[22] Filed: Apr. 8, 1985

[51] Int. Cl.$^4$ .............................. G03C 5/24; G03F 7/26
[52] U.S. Cl. ...................................... 430/19; 430/270; 430/286; 430/945; 430/21; 430/322; 346/76 L; 346/135.1; 369/284; 525/420.5
[58] Field of Search ................ 430/270, 286, 945, 19, 430/21, 322; 346/76 L, 135.1; 369/284; 525/420.5; 524/100, 606; 8/516

[56] References Cited

U.S. PATENT DOCUMENTS

| | | | |
|---|---|---|---|
| 3,637,581 | 1/1972 | Horiguchi et al. | 260/41.5 R |
| 4,063,877 | 12/1977 | Elliot et al. | 8/542 X |
| 4,355,087 | 10/1982 | Martin | 430/7 |
| 4,399,258 | 8/1983 | Hinze et al. | 525/420.5 X |
| 4,446,223 | 5/1984 | Wadsworth et al. | 430/945 X |
| 4,450,215 | 5/1984 | Reithel et al. | 430/7 |
| 4,478,782 | 10/1984 | Kuder et al. | 430/945 X |
| 4,492,750 | 1/1985 | Law et al. | 430/270 |
| 4,535,010 | 8/1985 | Axén et al. | 427/246 |
| 4,551,413 | 11/1985 | Bell | 430/270 |
| 4,581,317 | 8/1986 | Simmons, III | 430/270 |

FOREIGN PATENT DOCUMENTS

| | | | |
|---|---|---|---|
| 0097509 | 1/1984 | European Pat. Off. | |
| 0153736 | 9/1985 | European Pat. Off. | |
| 2414213 | 9/1979 | France | 430/281 |
| 59-45195 | 3/1984 | Japan | 430/945 |
| 59-62188 | 4/1984 | Japan | 430/945 |

*Primary Examiner*—Paul R. Michl
*Assistant Examiner*—Cynthia Hamilton
*Attorney, Agent, or Firm*—Burns, Doane, Swecker & Mathis

[57] ABSTRACT

Provide is an optical data storage medium comprising a chromophore/polymer composition information layer, wherein the polymer and chromophore are chemically bound so as to improve chromophore/polymer compatibility. If necessary, the chromophore or the polymer may be modified to improve their interaction. When modification is desired, it is preferred to modify the polymer so as not to disturb the chromophore structure, which is generally selected for its absorption features. The interaction between the chromophore and polymer can be either covalent on non-covalent. The overall result is an information layer having improved chromophore/polymer compatibility.

5 Claims, No Drawings

OPTICAL DATA STORAGE MEDIUM COMPRISING A CHROMOPHORE/POLYMER INFORMATION LAYER

BACKGROUND OF THE INVENTION

1. Field of the Invention:

This invention relates to a novel optical information recording medium and the recording of information thereon. More particularly, the present invention relates to an information recording medium, preferably in the form of a disk or in a tape format, suitable for use with optical recording and playback apparatus, with the information layer of the recording medium comprising a chromophore/polymer composition. In particular, the polymer and/or chromophore of the composition are chemically bound in order to improve compatibility.

2. Description of the Prior Art:

Optical recording methods in which light from a laser is focused upon the surface of a recording medium with sufficient intensity to cause a detectable change in the physical characteristics of the surface material have been proposed. Among these methods is the establishment of an information pattern of pits. In such methods, the information representative pattern of pits may be formed in the surface of the recording medium by suitably controlling the intensity of the focused light in accordance with the information to be recorded while relative motion is established between the recording medium and the focused light spot.

The recording medium, of course, is one of the key elements in any optical information storage system. The commercial viability of the recording medium depends upon such technical parameters as the sharpness in recording and playback of the information, i.e., a high signal to noise ratio. Dyes and pigments have accordingly been employed in information layers, often to enhance the sensitivity of the recording layers at the particular wavelength of the laser being used, which results in a much sharper recording and playback of information.

For example, Spong, U.S. Pat. No. 4,097,895, describes a recording medium which comprises a light reflecting material, such as aluminum or gold, coated with a dye-containing light absorbing layer, such as fluorescein, which is operative with an argon laser light source. The thickness of the light absorbing layer is chosen so that the structure has minimum reflectivity. An incident light beam then ablates, vaporizes or melts the dye-containing light absorbing layer, leaving a hole and exposing the light reflecting layer. After recording at the wavelength of the recording light, maximum contrast between the minimum reflectance of the light absorbing layer and the reflectance of the light reflecting layer exists.

Carlson, in U.S. Pat. No. 3,475,760, discloses a system for directly recording information in a thermoplastic film as a deformation by using a high energy laser scanning beam of small diameter. It is further disclosed that the sensitivity of the films for laser film deformation recording can be enhanced by the addition of pigments or dyes which exhibit a high absorption at the laser wavelength. Erasure of the film deformation is accomplished by recording over the information to be erased using a similar laser beam but with a much smaller scan line spacing, preferably so as to provide overlap of the scan lines.

Other U.S. patents which disclose the use of a light absorbing dye in the recording layer include U.S. Pat. Nos. 4,412,231 and 4,446,223. The former patent discloses using a mixture of dyes having different light absorbing wavelengths so that the resulting recording layer has a light absorptivity of 80% or more at all the wavelengths in the range of from 400-900 nm. The latter patent discloses an optical information recording element comprising a support coated with a layer of an amorphous composition, which composition comprises a binder and an oxoindolizine or oxoindolizinium dye.

In a paper entitled "Single Wavelength Optical Recording in Pure, Solvent Coated Infrared Dye Layers" by Gravesteijn, Steenbergen and van der Veen, experiments on the use of certain dyes for optical recording for digital and video applications at GaAlAs laser wavelengths are reported. The paper was presented at the Proceeding of the SPIE, "Optical Storage Media", volume 420, June 6-10, 1983. The specific dyes discussed in the paper are squarylium dyes and pentamethine dyes. It is further suggested that solubility in organic solvents can be greatly increased by the introduction of t-butyl groups into thiopyrylium end groups.

The use of dyes in conjunction with optical recording media comprising a styrene oligomer is disclosed in the article by Kuroiwa et al appearing in the *Japanese Journal of Applied Physics*, Vol. 22, No. 2, February 1983, pp. 348-343. Among the dyes and pigments discussed as being useful is a copper phthalocyanine pigment. Phase separation and incompatibility between the dyes and oligomers are noted in the article as being problems in the use of dyes for optical information media.

The use of other metal phthalocyanine dyes in optical recording media is disclosed, for example, in U.S. Pat. No. 4,458,804. Note also, U.S. Pat. No. 4,492,750, which discloses the use of specific naphthalocyanine compounds in optical recording media. The film-coating properties of such dye materials, however, have been generally found to be relatively poor, the read out signal/noise (S/N) ratio relatively poor and tending to fluctuate depending on the particular portion of the layer, and the S/N ratio of the read-out deteriorating significantly after repeated irradiations of the read-out light.

Horiguchi et al, U.S. Pat. No. 3,637,581, discloses chromogen-bonded polymers, with the chromogen possibly being a metal phthalocyanine. The suitability and use of such products in optical mass data storage applications, however, are not disclosed therein.

Thus, while dyes or pigments have been employed in the information storage layers of optical recording media due to their excellent absorption properties, problems are encountered with regard to the application of the dyes or pigments in a stable layer. The addition of dyes to film-forming polymers due to limited solubility of the dye in the polymer and the tendency of the dye/polymer mixture to phase separate over time, as noted above, are severe problems which need to be overcome. Indeed, the higher the pigment or dye concentration, the more likely such problems are encountered. Yet, it is desired to increase the dye concentration in the information layer so as to increase the sensitivity of the medium, the recording rate possible and the S/N ratio upon read-out. Indeed, it is necessary for the dye to be uniformly distributed in the polymer matrix, at a concentration level to insure the presence of dye in every volume exposed to the laser radiation.

The search for an improved information storage medium comprising a dye or pigment composition overcoming the aforementioned problems is thereby continuously ongoing. What is desired is a recording layer material which of course exhibits a high extinction coefficient, but which also eliminates the problem of dye migration and hence phase separation over time. Excellent stability with respect to thermal, actinic and oxidative degradation is also a desirable feature.

Accordingly, it is a major object of the present invention to provide a novel and improved recording medium which comprises a chromophore in the information layer.

It is yet another object of the present invention to provide a novel optical recording medium which allows for ready application of the chromophore layer to form a stable information layer, while still exhibiting excellent absorption properties.

Still another object of the present invention is to provide a novel recording medium which contains a chromophore in the information layer, yet for which the problem of dye migration and hence phase separation over time frequently encountered in dye/polymer mixtures is eliminated.

These and other objects, as well as the scope, nature and utilization of the invention, will be apparent to those skilled in the art from the following description and the appended claims.

SUMMARY OF THE INVENTION

In accordance with the foregoing objectives, provided hereby is a medium for storage of optical information, i.e., information recorded and played by optical means, which medium comprises a chromophore/polymer composition wherein the chromophore is chemically bound with the polymer. The bonding may be covalent or ionic. If necessary, the chromophore or polymer, or both, can be chemically modified to increase their compatibility and chemical interaction.

In a most preferred embodiment, the medium for storage of optical information is in the form of a disk. Furthermore, the medium is erasable.

In another embodiment of the present invention, there is provided a method of recording information in a thin film deposited on a relatively thick substrate by irradiating the film with a laser beam in accordance with said information to form pits in the film, the improvement which comprises said film being comprised of a chromophore/polymer composition wherein the chromophore is chemically bound to the polymer. If necessary, the polymer and/or chromophore have been chemically modified to increase their compatibility.

In another embodiment there is provided by the present invention a readable information medium comprising a relatively thick and thermally stable substrate having coated thereon a layer comprising an information track comprised of a chromophore/polymer composition. The chromophore of the composition is chemically bound to the polymer. If necessary, the polymer and/or chromophore have been chemically modified to increase their compatibility.

DETAILED DESCRIPTION OF THE PREFERRED EMBODIMENT

The recording or information layer of the optical data storage medium of the present invention comprises a chromophore/polymer composition. The chromophore is chemically bound to the polymer so that the composition can be considered essentially a one-component, one-phase system with the one-phase comprising the combination of the polymer chemically interacting with the chromophore.

In general, any chromophore compound which can be useful in optical storage media can be used for the purposes of the present invention. Such chromophores include cation containing (or basic) dyes and anion containing (or acidic) dyes.

Examples of appropriate chromophore compounds for use in the present invention include, but are not limited to, the following:

(i) triazine dyes available commercially under the trademarks PROCION and CIBACHRON;

(ii) sulfate esters of beta-hydroxyethylsulfone, which are available commercially under the trademark REMAZOL;

(iii) pyrimidine dyes, which are available commercially under the trademarks REACTONE; DRIMARENE X; VEROFIX; REACTOLAN; and DRIMALAN F;

(iv) quinoxaline dyes, which are available commercially under the trademarks LEVAFIX E and CAVALITE;

(v) benzthiazole dyes, which are available commercially under the trademark REATEX; and, (vi) pyridazone dyes, which are available commercially under the trademark PRIMAZINE P.

The foregoing chromophores are particularly compatible with reactive dimer acid polyamides as the chromophores form covalent bonds with reactive amine or hydroxyl groups. Examples of other suitable chromophores include tetracyano quinone dimethane (TCNQ).

The polymer to which the chromophore is bound is preferably a polymer having good film-forming and thermochemical properties so that it can be effectively employed in an optical information medium, and which has a suitable site for chemical bonding. Of course, if the chosen polymer does not have a suitable reactive site for bonding with the chromophore, reactive moieties can generally be reacted with the polymer to provide a product having suitable pendant reactive moieties or small percentages of comonomers or termonomers can be incorporated into the polymer structure to provide sites which can interact with the chromophore.

While modification of any particular chromophore compound can be made to improve compatability, it is generally preferred to modify, e.g., add pendant groups, the polymer so as not to disturb the chromophore structure which is generally selected for its absorption features. As discussed above, pendant groups can be added to the polymers, such as dihydroxy carbazole, which provides an excellent reaction site for the chromophore tetracyano quinodimethane. Specific comonomers thought to be suitable for the modification of, for example, dimer acid polyamides or other diacid containing polymers, in order to improve their compatability with cation containing dyes or basic dyes, include sulfonic acid containing diacids such as 5-sulfoisophthalic acid. For increased compatability with acidic-chromophores, the diacid polymer may be modified with triamines or polyfunctional amines. Reactive dimer acid polyamides can also be reacted with a cyclic acid anhyride to form an amide-acid which can form ionic bonds with cationic chromophoric compounds. Alternatively, alkylating agents may be used to form quaternary ammonium moieties on the polymer which can form ionic bonds with anionic containing chromophores.

In general it has been found most desirable to employ polymers having reactive heterocyclic amine moieties or certain ionic moieties which may either be incorporated into the backbone of the polymer or attached to the polymer as pendant groups. Particularly effective heterocyclic amine moieties include imidazolines, pyridines and imidazoles. Preferred ionic moieties include thiolates and carboxylates.

Examples of suitable polymers for the purposes of the present invention are the dimer acid polyamides, polyamides, poly(vinylpyridine), polyurethanes, polyesters, silicons and vinyl polymers such as styrene polymers. The preferred polymers are dimer acid polyamides and poly(vinylpyridine). Of particular preference are the dimer acid polyamides Emerez 1565 and Emerez 1514, e.g., as disclosed in U.S. Pat. No. 4,478,782, which is hereby expressly incorporated by reference.

Once the polymer has been synthesized, it can be reacted directly with the chromophore by conventional reaction procedures to yield the one-component, one-phase composition. Generally, the reaction is controlled so that the amount of chromophore incorporated into the polymer comrises less than 25% by weight of the material. Functionally, of course, the lower limit of the amount of the chromophore incorporated is determined by the suitable optical absorption properties of the material. The upper limit of the amount of chromophore incorporated is determined by the desired thermomechanical properties exhibited by the material.

The chromophore/polymer material of the subject invention allows one to realize the excellent absorption properties of the chromophore, e.g., high extinction coefficient, while also realizing the benefits of the thermomechanical properties of a film-forming material as a result of the film-forming properties arising from the polymer. As well, since a single component, single-phase material is used, the problem of dye/polymer phase separation is avoided. Chemically bonding the chromophore to the polmer also allows much higher effective chromophore concentrations in the recording layer than simple solutioning of a dye in a polymer. The result is increased sensitivity so data recording is possible with lower laser power at faster speeds.

The film formed by the chromophore/polymer material of the present invention may be self-supporting, in which case any suitable or conventional casting technique may be used. Generally, however, it is preferred to cast the material as a film on a suitable support to add dimensional stability and support thereto. As well, the film my not always be self-supporting. The substrate may be optically featureless or may contain preformatting information (e.g., tracking groove and/or encoded information in the form of readable marks.) It is important when coating a substrate, of course, that an extremely flat homogeneous information recording surface be obtained to preclude the scattering of light.

Any suitable coating technique may be used to achieve such a flat surface, with a conventional technique such as spin coating, which allows for a high degree of control of film thickness and flatness, being preferred. It is, of course, desired and preferred that the one-component, one-phase material form a thin film coating.

The substrate which is coated with the chromophore/polymer material should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such smoothing or subbing layer should not, of course, interfere with application or utilization of the recording layer which is subsequently applied thereto. The subbing layer can contain preformtting information.

The material of which the substrate is comprised is generally a material exhibiting good structural integrity against warping and mechanical strength. Examples of suitable materials include aluminum, glass, reinforced glass, ceramics, polymethacrylates, polyacrylates, polycarbonates, phenolic resins, epoxy resins, polyesters, polyimides, polyether sulfones, polyether ketones, polyolefins, polyphenylene sulfide and nylon. Furthermore, the shape and size of the substrate, and hence the recording medium, can vary depending on the application. The shape and format, for example, may be a disk, tape, belt or drum. A disk shape or tape format is most preferred.

The structure of the recording medium itself may also vary in that the recording layer may be coated on one side or both sides of the substrate. Or, two substrates having the recording layer on either side can be combined allowing the sides having the recording layers to face each other at a constant distance, the combined substrates being sealed to prevent dust contamination and scratches.

The medium of this invention may also have an undercoating layer such as a metal reflective layer or layer of various resins on the substrate if necessary, with the recording layer being coated over it. In addition, various thermoplastic resins, thermosetting resins, UV or electron beam cured resins, may be used as an undercoating material. Furthermore, it is possible to laminate layers from the substrate as follows: a reflective layer, undercoating layer and recording layer. The film thickness of the recording layer may be designed to be nonreflective if desired.

In addition, guiding grooves may be installed on the substrate, and the recording layer may be installed on the extruded portions and/or intruded portions of the grooves. Furthermore, if necessary, a reflective layer or opaque layer may be installed over the recording layer.

A suitable protective layer or cover, such as those known to the art, can also be used if desired to protect the recording layer from dirt, dust, scratches or abrasion.

In addition to the chromophore/polymer composition, the recording layer may also contain other polymers or oligomers, various plasticizers, surfactants, antistatic agents, smoothening agents, flame retardants, stabilizers, dispersants, leveling agents, antibleeding agents, antioxidants, water repellents, emulsifiers, etc. as may be desired. The effect the presence of such additives may have on the optical properties of the medium, however, should be taken into account.

In an illustrative recording system embodying the principles of the present invention, a record blank disk form may be subject to rotation at a constant linear or constant angular velocity while a beam of light from a light source, e.g., a laser, is focused on the information surface of the disk. The wavelength of the light being compatible with the absorption characteristics of the chromophore/polymer composition of which the recording layer is comprised. The intensity of the light beam is controlled in accordance with the information to be recorded. Illustratively, the control is effected in accordance with carrier waves modulated in frequency by information containing signals, with the light beam intensity varying as a result between a high level sufficient to effect a detectable change in the physical characteritics of the absorptive recording layer material and a low level insufficient to effect such a detectable change, the frequency of the level alternations varying as the signal amplitude changes. Preferred writing speeds are in the range of from $10^6$ to $10^7$ bits per second.

The relative diameter and depth of the holes or pits formed will, of course, depend not only on the optical and thermal properties of the one-component information layer, but also on the characteristics of the writing beam, i.e., focused spot diameter, depth of focus, intensity profile and intensity and duration of the writing pulse. Optimization of these parameters is familiar to those skilled in the art.

As a result of the pit-formation in the recording layer material, an information track comprising a succession of spaced pits is formed in the information surface of the disk, the pits appearing in those surface regions exposed to the high intensity beam. Variations in the length and separation of the pits are representative of the recorded information.

The result of the above-described recording process is the formation of an information record of a form which facilitates recovery of the recorded information by optical playback processes. The information track of such an information record comprises (1) undisturbed surface regions alternating with (2) pit regions formed by the pit-forming process, preferably coated on a substrate. This information track can be in either analog or digital form, for example, audio, video or computer data.

In playback or read operations pursuant to the principles of the present invention, a light beam is focused upon the information track of an information record. The playback beam has a constant intensity at a level insufficient to effect pit formation in the informaion layer or erasure of the recorded information by levelling. A photodetector, positioned to receive light reflected from the successive regions of the information track as they pass through the path of the focused light, develops a signal representative of the recorded information.

Several variations in the playback or reading system as known to the art are possible. The most preferred mode of reading information involves the relative reflection between the one-component material surface and those areas in which pits have been formed in the recordation of information. When the reflectivity of the one-component material surface is of relatively high reflectivity as compared to that of the substrate or other underlying layers, the reflectivity in the areas of the pits will be less than in the regions without pits when a beam from the read laser passes thereby. Thus, a written bit can be registered as a decrease in reflected intensity. When the relative reflectivity of the one-component material surface is low as compared to that of the substrate and other underlying layers, however, the reflectivity in the areas of the pits will be more than in the regions without pits when a beam from the read laser is focused thereon. Accordingly, a written bit can be registered as an increase in reflected intensity.

An advantage of the present invention is that the resulting information medium can also be suitable for erasure. Generally, complete and accurate erasure of recorded information, when a pit-forming read/write mode is used, can be readily carried out by heating the medium to a sufficiently high temperature such that the chromophore/polymer one-component material becomes softened sufficiently to allow levelling of the surface. This can be done globally by heating the entire disk in an oven or some other suitable heating means, or by means of a defocused laser beam whose intensity at the surface of the information layer is intermediate between that of the write beam and read beam. It is generally necessary to heat an area greater than that of a single bit (typically 1 m in diameter).

The present invention is further illustrated by the following examples. Preparation of a chromophore/polymer composition in accordance with the present invention is illustrated. The details in the following examples, however, are in no way meant to be limitative, but rather merely illustrative.

EXAMPLE 1

In a 100 ml. round bottom flask was dissolved 9.05 g of Emerez 1565 (a dimer acid polyamide available from Emery Industries, Inc.) in 50 ml of dimethyl acetamide with heating. After cooling to room temperature, 8.4 g of Procion Blue HB (a triazine dye available from ICI) was added to the solution. The flask was then again heated for seventeen hours at 95° C.

The reaction mixture was poured into 100 ml of 5% $NaHCO_3$ solution. A gel formed, which was then poured into 200 ml of distilled water and stirred overnight. A solid was then collected on filter paper by suction filtration. The polymer composition had to be scraped from the filter paper as it tended to stick thereto. A final wash was then made by stirring the solid overnight in 200 ml of distilled water and collected on filter paper.

EXAMPLE 2

9.05 g of Emerez 1565 were dissolved in 50 ml of dimethyl acetamide in a 100 ml round bottom flask upon heating. The flask was cooled to room temperature and 6.2 g of Remazol Brilliant Blue R (a sulfate ester of beta-hydroxyethylsulfone available from Hoechst) was added thereto. The flask was then heated for seventeen hours at 95° C.

The resulting reaction mixture was poured into 100 ml of 5% $NaHCO_3$ solution, with a gel forming. The gel was stirred overnight with 200 ml of distilled water. A solid was then collected on filter paper by suction filtration. The recovered solid was then subjected to a final wash with stirring overnight in 200 ml distilled water.

Although the invention has been described with preferred embodiments, it is to be understood that variations and modificatons may be resorted to as will be apparent to those skilled in the art. Such variations and modifications are to be considered within the purview and the scope of the claims appended hereto.

What is claimed is:

1. A method of erasing a deformation information pattern of an optical information medium, which deformation pattern is formed in a film deposited on a substrate and with said erasing being achieved by heating or imparting energy to said film, the improvement which comprises said film being comprised of a polymer and a tetracyano quinonedimethane chromophore, with the chromophore being chemically bound to the polymer.

2. A readable information medium comprising a thermally stable substrate having coated thereon a layer comprising an information track comprised of a succession of spaced pits, said layer being comprised of a dimer acid polyamide polymer and a chromophore which is comprised of a functional moiety selected from the group consisting of a triazine, sulfate ester of beta-hydroxyethylsulfone, pyrimidine, quinoxaline, benzthiazole and pyridazone functional moiety, which chromophore is chemically bound to the polymer.

3. A method of recording information in a thin film deposited on a substrate by irradiating the film with a laser beam in accordance with said information to form pits in the film, the improvement which comprises said film being comprised of a dimer acid polyamide polymer and a chromophore which is comprised of a functional moiety selected from the group consisting of a triazine, sulfate ester of beta-hydroxyethylsulfone, pyrimidine, quinoxaline, benzthiazole and pyridazone functional moiety and, with the chromophore being chemically bound to the polymer.

4. A method of erasing a deformation information pattern of an optical information medium, which deformation pattern is formed in a film deposited on a substrate and with said erasing being achieved by heating or imparting energy to said film, the improvement which comprises said film being comprised of a dimer acid polyamide polymer and a chromophore which is comprised of a functional moiety selected from the group consisting of a triazine, sulfate ester of beta-hydroxyethylsulfone, pyrimidine, quinoxaline, benzthiazole and pyridazone functional moiety and, with the chromophore being chemically bound to the polymer.

5. A medium for storage of optical information comprising a polymeric information layer, the improvement which comprises said polymeric information layer comprising a chromophore which is comprised of a triazine, sulfate ester of beta-hydroxyethylsulfone, pyrimidine, quinoxaline, benzthiazole or pyridazone functional moiety, which is chemically bonded to a dimer acid polyamide polymer, wherein the dimer acid polyamide polymer is modified to have pendant reactive moieties to provide sites to interact chemically with the chromophore, with the pendant moieties being a dihydroxycarbazole, imidizoline, pyridine, imidazole, thiolate or carboxylate moiety.

* * * * *